(12) United States Patent
Miao et al.

(10) Patent No.: US 11,367,354 B2
(45) Date of Patent: Jun. 21, 2022

(54) TRAFFIC PREDICTION BASED ON MAP IMAGES FOR AUTONOMOUS DRIVING

(71) Applicant: APOLLO INTELLIGENT DRIVING TECHNOLOGY (BEIJING) CO., LTD., Beijing (CN)

(72) Inventors: Jinghao Miao, San Jose, CA (US); Liyun Li, Sunnyvale, CA (US); Zhongpu Xia, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 337 days.

(21) Appl. No.: 15/542,412

(22) PCT Filed: Jun. 22, 2017

(86) PCT No.: PCT/CN2017/089488
§ 371 (c)(1),
(2) Date: Jul. 7, 2017

(87) PCT Pub. No.: WO2018/232681
PCT Pub. Date: Dec. 27, 2018

(65) Prior Publication Data
US 2018/0374360 A1 Dec. 27, 2018

(51) Int. Cl.
*G08G 1/16* (2006.01)
*G08G 1/01* (2006.01)
(Continued)

(52) U.S. Cl.
CPC ........... *G08G 1/166* (2013.01); *G05D 1/0088* (2013.01); *G05D 1/0214* (2013.01);
(Continued)

(58) Field of Classification Search
None
See application file for complete search history.

(56) References Cited

U.S. PATENT DOCUMENTS 7,974,781 B2 * 7/2011 Emoto ............... G01C 21/3638
340/995.17
8,195,394 B1 6/2012 Zhu et al.
(Continued)

FOREIGN PATENT DOCUMENTS

CN 1954343 A 4/2007
CN 101608924 A 12/2009
(Continued)

*Primary Examiner* — Peter D Nolan
*Assistant Examiner* — Demetra R Smith-Stewart
(74) *Attorney, Agent, or Firm* — Womble Bond Dickinson (US) LLP

(57) ABSTRACT

In one embodiment, in response to perception data perceiving a driving environment surrounding an ADV, a map image of a map covering a location associated with the driving environment is obtained. An image recognition is performed on the map image to recognize one or more objects from the map image. An object may represent a particular road, a building structure (e.g., a parking lot, an intersection, or a roundabout). One or more features are extracted from the recognized objects, where the features may indicate or describe the traffic condition of the driving environment. Behaviors of one or more traffic participants perceived from the perception data are predicted based on the extracted features. A trajectory for controlling the ADV to navigate through the driving environment is planned based on the predicted behaviors of the traffic participants. A traffic participant can be a vehicle, a cyclist, or a pedestrian.

18 Claims, 8 Drawing Sheets

(51) Int. Cl.
*G08G 1/04* (2006.01)
*G06K 9/00* (2022.01)
*G06K 9/46* (2006.01)
*G05D 1/00* (2006.01)
*G05D 1/02* (2020.01)
*G06F 16/29* (2019.01)
*G06V 10/40* (2022.01)
*G06V 20/56* (2022.01)
*G06V 20/58* (2022.01)
*G08G 1/0962* (2006.01)

(52) U.S. Cl.
CPC ......... *G05D 1/0246* (2013.01); *G05D 1/0274* (2013.01); *G06F 16/29* (2019.01); *G06V 10/40* (2022.01); *G06V 20/56* (2022.01); *G06V 20/58* (2022.01); *G06V 20/588* (2022.01); *G08G 1/0112* (2013.01); *G08G 1/04* (2013.01); *G08G 1/163* (2013.01); *G05D 2201/0213* (2013.01); *G08G 1/09626* (2013.01)

(56) References Cited

U.S. PATENT DOCUMENTS

| | | | | |
|---|---|---|---|---|
| 8,660,734 | B2* | 2/2014 | Zhu | G06T 7/521 701/23 |
| 8,751,154 | B2* | 6/2014 | Zhang | B60W 30/09 701/411 |
| 9,120,484 | B1* | 9/2015 | Ferguson | G06T 7/521 |
| 9,395,192 | B1 | 7/2016 | Silver et al. | |
| 9,632,502 | B1* | 4/2017 | Levinson | G01S 17/87 |
| 9,672,446 | B1* | 6/2017 | Vallespi-Gonzalez | G06K 9/6267 |
| 9,953,236 | B1* | 4/2018 | Huang | G06K 9/34 |
| 10,026,309 | B1* | 7/2018 | Nepomuceno | G08G 1/166 |
| 2013/0173097 | A1 | 7/2013 | Jotanovic | |
| 2014/0379247 | A1* | 12/2014 | Ferguson | B60W 30/16 701/301 |
| 2015/0106010 | A1* | 4/2015 | Martin | G08G 1/0129 701/410 |
| 2015/0166062 | A1* | 6/2015 | Johnson | B60W 10/20 701/41 |
| 2015/0348318 | A1* | 12/2015 | Meyer | G01C 21/26 701/532 |
| 2015/0354976 | A1 | 12/2015 | Ferencz et al. | |
| 2016/0061612 | A1* | 3/2016 | You | G01C 21/26 701/409 |
| 2016/0086051 | A1* | 3/2016 | Piekniewski | G06T 7/90 382/103 |
| 2016/0161271 | A1* | 6/2016 | Okumura | G01C 21/34 701/25 |
| 2016/0180171 | A1* | 6/2016 | Kamata | G05D 1/0274 382/103 |
| 2016/0209846 | A1* | 7/2016 | Eustice | G05D 1/0246 |
| 2016/0223346 | A1 | 8/2016 | Mayrhofer et al. | |
| 2016/0272243 | A1* | 9/2016 | Matsuno | G05D 1/0219 |
| 2016/0358477 | A1* | 12/2016 | Ansari | G06Q 30/0251 |
| 2017/0008521 | A1* | 1/2017 | Braunstein | G01C 21/36 |
| 2017/0140245 | A1* | 5/2017 | Kraft | G06K 9/0063 |
| 2017/0166131 | A1 | 6/2017 | Oba | |
| 2017/0177937 | A1* | 6/2017 | Harmsen | G06T 7/579 |
| 2017/0329332 | A1* | 11/2017 | Pilarski | B60W 50/0097 |
| 2017/0343362 | A1* | 11/2017 | Shen | G01C 21/3694 |
| 2018/0363337 | A1* | 12/2018 | Zhu | G05D 1/0088 |

FOREIGN PATENT DOCUMENTS

| | | |
|---|---|---|
| CN | 103226354 A | 7/2013 |
| CN | 104203705 A | 12/2014 |
| CN | 104574952 A | 4/2015 |
| CN | 105320934 A | 2/2016 |
| CN | 105675005 A | 6/2016 |
| CN | 106384506 A | 2/2017 |
| CN | 106537905 A | 3/2017 |
| EP | 0290633 A1 | 11/1988 |
| KR | 10-2006-0134719 A | 12/2006 |
| KR | 10-1621649 B1 | 5/2016 |

* cited by examiner

TRAFFIC PREDICTION BASED ON MAP IMAGES FOR AUTONOMOUS DRIVING

CROSS-REFERENCE TO RELATED APPLICATION

This patent application is a U.S. National Phase Application under 35 U.S.C. § 371 of International Application No. PCT/CN2017/089488, filed Jun. 22, 2017, entitled "TRAFFIC PREDICTION BASED ON MAP IMAGES FOR AUTONOMOUS DRIVING," which is incorporated by reference herein by its entirety.

TECHNICAL FIELD

Embodiments of the present disclosure relate generally to operating autonomous driving vehicles. More particularly, embodiments of the disclosure relate to traffic prediction for operating autonomous driving vehicles.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Traffic prediction is a critical component in implementing a fully autonomous driving solution. It functions as a human brain to predict where the surrounding traffic participants will go next in the near future so that an autonomous driving vehicle itself can make a safe and correct action accordingly. Traffic prediction heavily relies on a high precision map (also referred to as a high-definition map) in predicting the behaviors of traffic participants in the near future. However, making a high precision map is costly and time consuming. It requires a lot of human labeling work, which is very costly and time consuming. It is subject to human mistakes and errors which sometimes can be risky for autonomous driving vehicles.

SUMMARY

Embodiments of the present disclosure provide a computer-implemented method for operating an autonomous driving vehicle, a non-transitory machine-readable medium, and a data processing system.

In an aspect of the disclosure, the computer-implemented method for operating an autonomous driving vehicle comprises: in response to perception data perceiving a driving environment surrounding an autonomous driving vehicle (ADV), obtaining a map image of a map covering a location associated with the driving environment; performing an image recognition of the map image to recognize one or more objects from the map image; extracting one or more features from the recognized objects, wherein the one or more features indicate a traffic condition of the driving environment; predicting behaviors of one or more traffic participants perceived from the perception data based on the extracted features; and planning a trajectory for controlling the ADV to navigate through the driving environment based on the predicted behaviors of the one or more traffic participants.

In another aspect of the disclosure, the non-transitory machine-readable medium has instructions stored therein, which when executed by a processor, cause the processor to perform operations. The operations comprises: in response to perception data perceiving a driving environment surrounding an autonomous driving vehicle (ADV), obtaining a map image of a map covering a location associated with the driving environment; performing an image recognition of the map image to recognize one or more objects from the map image; extracting one or more features from the recognized objects, wherein the one or more features indicate a traffic condition of the driving environment; predicting behaviors of one or more traffic participants perceived from the perception data based on the extracted features; and planning a trajectory for controlling the ADV to navigate through the driving environment based on the predicted behaviors of the one or more traffic participants.

In a further aspect of the disclosure, the data processing system comprises: a processor; and a memory coupled to the processor to store instructions, which when executed by the processor, cause the processor to perform operations. The operations includes: in response to perception data perceiving a driving environment surrounding an autonomous driving vehicle (ADV), obtaining a map image of a map covering a location associated with the driving environment, performing an image recognition of the map image to recognize one or more objects from the map image, extracting one or more features from the recognized objects, wherein the one or more features indicate a traffic condition of the driving environment; predicting behaviors of one or more traffic participants perceived from the perception data based on the extracted features, and planning a trajectory for controlling the ADV to navigate through the driving environment based on the predicted behaviors of the one or more traffic participants.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosure will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

As image processing technologies become more and more mature. Many such technologies have been successfully applied in production of commercial merchandises such as face recognition, object detection and etc. According to one aspect of the disclosure, a novel approach for traffic prediction is to use a regular navigation map as an image with advanced vision technologies to identify important features from the map image, such as, for example, roads, parking lots, intersections, roundabouts, etc. These features are utilized for an autonomous driving vehicle (ADV) to make predictions for the behaviors of those traffic participants on the roads.

According to one embodiment, in response to perception data perceiving a driving environment surrounding an ADV, a map image of a map (e.g., a regular map or regular definition map) covering a location associated with the driving environment is obtained. An image recognition is performed on the map image to recognize one or more objects from the map image. An object may represent a particular road, a building structure (e.g., a parking lot), an intersection, or a roundabout, etc. One or more features are extracted from the recognized objects, where the features may indicate or describe the traffic condition of the driving environment. Behaviors of one or more traffic participants perceived from the perception data are predicted based on the extracted features. A trajectory for controlling the ADV to navigate through the driving environment is planned based on the predicted behaviors of the traffic participants. A traffic participant can be a vehicle, a cyclist, or a pedestrian.

Figure 1:
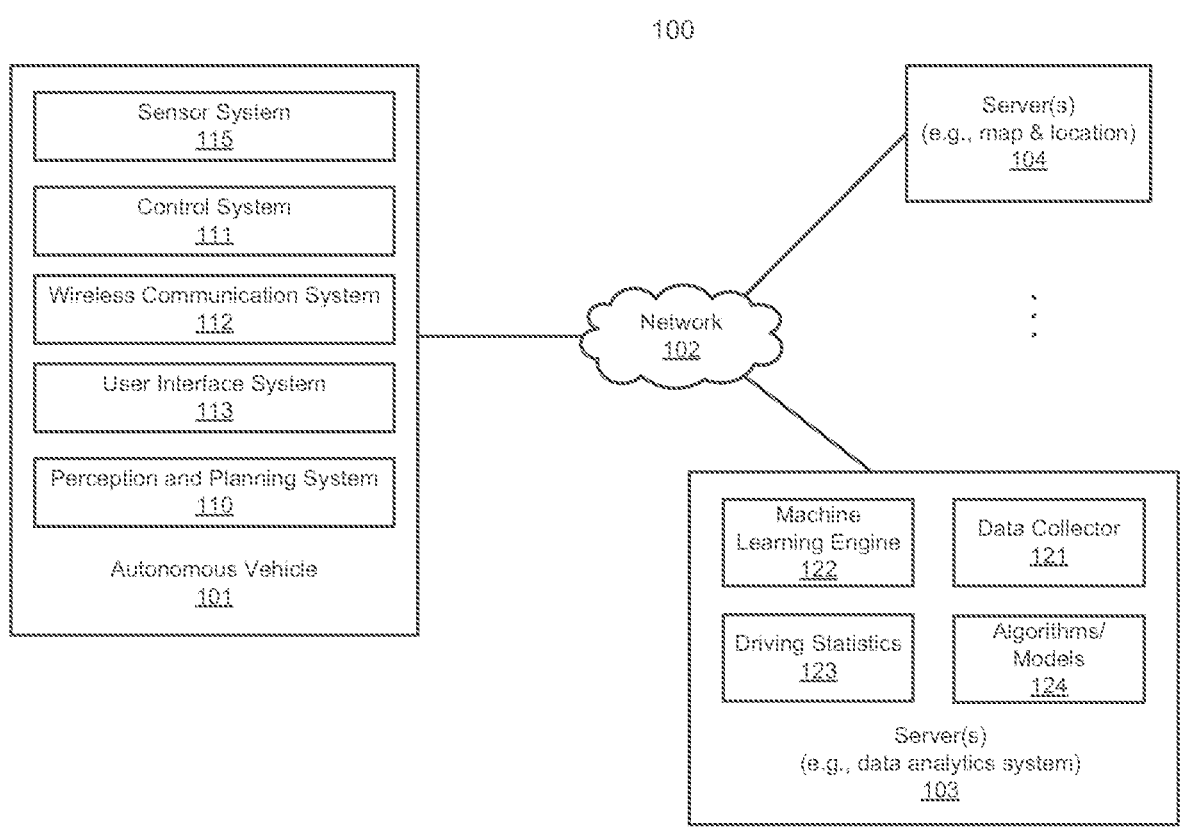
FIG. 1 is a block diagram illustrating a networked system according to one embodiment.

FIG. 1 is a block diagram illustrating an autonomous vehicle network configuration according to one embodiment. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
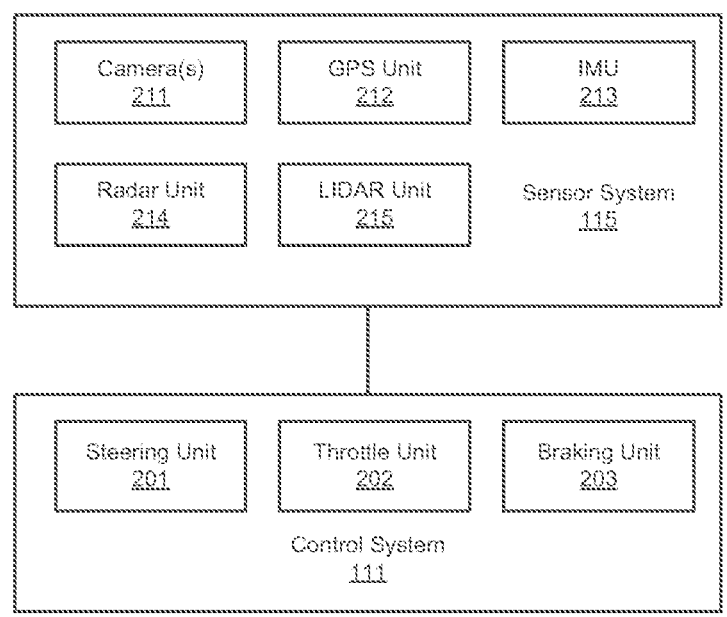
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203.

Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 11, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, rules/algorithms/models 124 include rules, algorithms, and/or models to recognize objects contained in a map image and to extract features from the objects. For example, rules/algorithms/models 124 may include data specifying how to recognize certain objects from a map image, for example, based on shapes and/or colors of the objects contained in the map image. For a certain type of objects, rules/algorithms/models 124 may further specify or implicate certain features that are associated with the objects such as for example, a stop sign, a yield sign, lane configuration (e.g., left-turn, right-turn, straight only lanes), entrance/exiting points, etc. The rules/algorithms/models 124 may then be uploaded onto the ADVs to be utilized for planning a trajectory to control the ADV in real-time.

Figure 3:
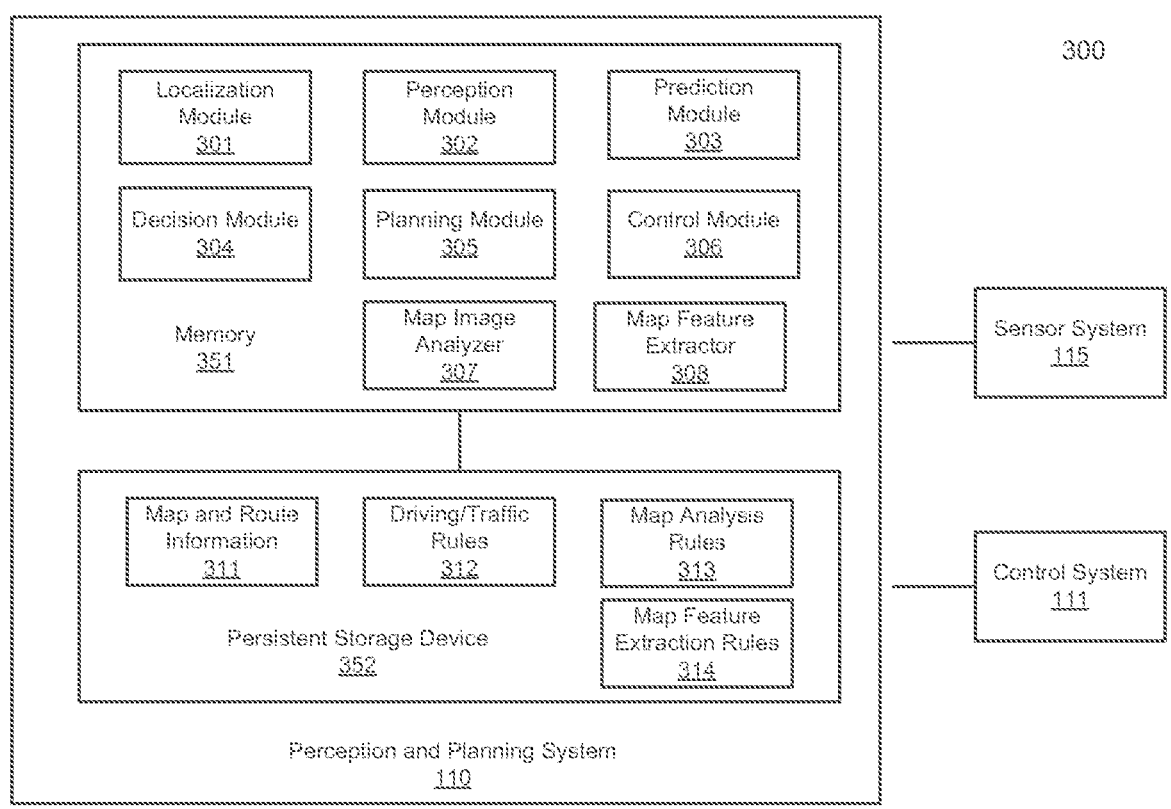
FIG. 3 is a block diagram illustrating an example of a perception and planning system used with an autonomous vehicle according to one embodiment.

FIG. 3 is a block diagram illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, map image analyzer 307, and map feature extractor 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
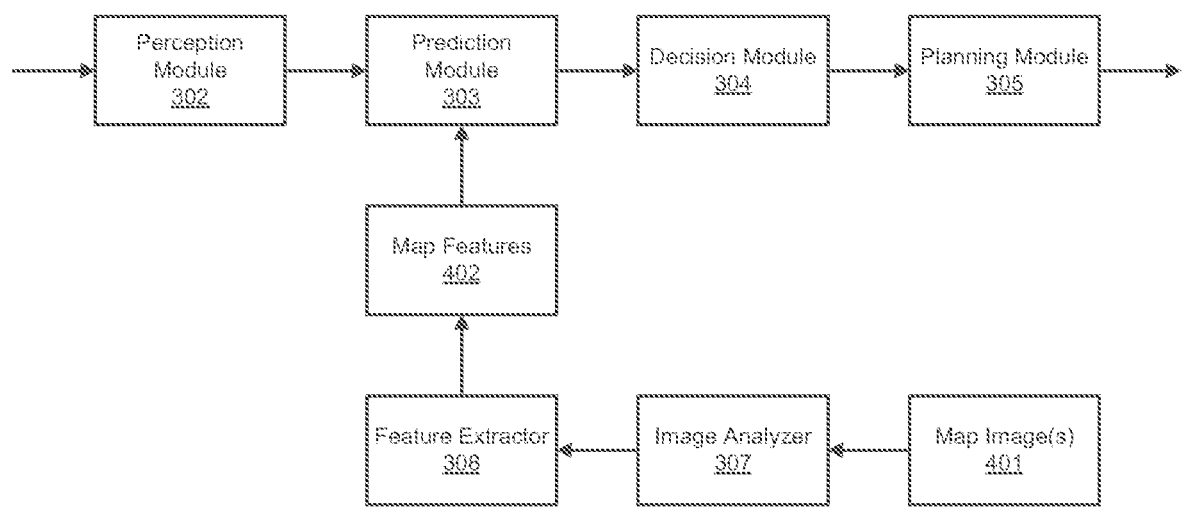
FIG. 4 is a transactional diagram illustrating a processing flow of operating an autonomous vehicle according one embodiment.

According to one embodiment, referring now to FIGS. 3 and 4, in response to an object perceived by perception module 302, prediction module 303 invokes map image analyzer 307 to analyze a map image covering a predetermined proximity with respect to a location associated with the current driving environment. Map image analyzer 307 is to perform an image recognition on the map image to recognize one or more objects contained in the map image. The recognized objects may be recognized as one or more roads, an intersection, a roundabout, or a building structure (e.g., parking lot) based on the shapes and/or colors of the objects using map analysis rules 313. Based on the recognized objects, map feature extractor 308 extracts or generates one or more features from the recognized objects using map feature extraction rules 314. The features may include information describing the objects. The features may further include additional features that are generated based on the recognized objects. The additional features may include those that are normally available from a high definition map, but are unavailable from a regular map, where the additional features may be implied based on the objects in view of feature extraction rules 314.

A high precision map provides lane level information on where this vehicle can possibly go. For example, it can only go straight or make a right turn given his current position in the map. It cannot go backward or make a left turn due to traffic law, etc. A regular map would not have this kind of information. Rather, a regular map would typically contain an image such as a satellite image of roads. However, a map image can contain an image of an object such as a road, an intersection, a building structure, a roundabout, etc. Based on shapes and/or colors of the object, an image recognition may be able to identify such objects.

According to one embodiment, identification of the objects may include road identification which may identify drivable roads from the map. This is useful to guide obstacles if they are moving on road lanes. The identification of objects may further include certain building structures such as a parking lot or parking areas along a road. This is useful for predicting if an obstacle is going to move to the parking lot. Identification of the objects may further include an intersection where traffic participants may have different behavior patterns at the intersection. Identification of the objects may further include a roundabout, where identifying roundabouts and their exits may help plan the trajectories of the traffic participants.

Figure 5:
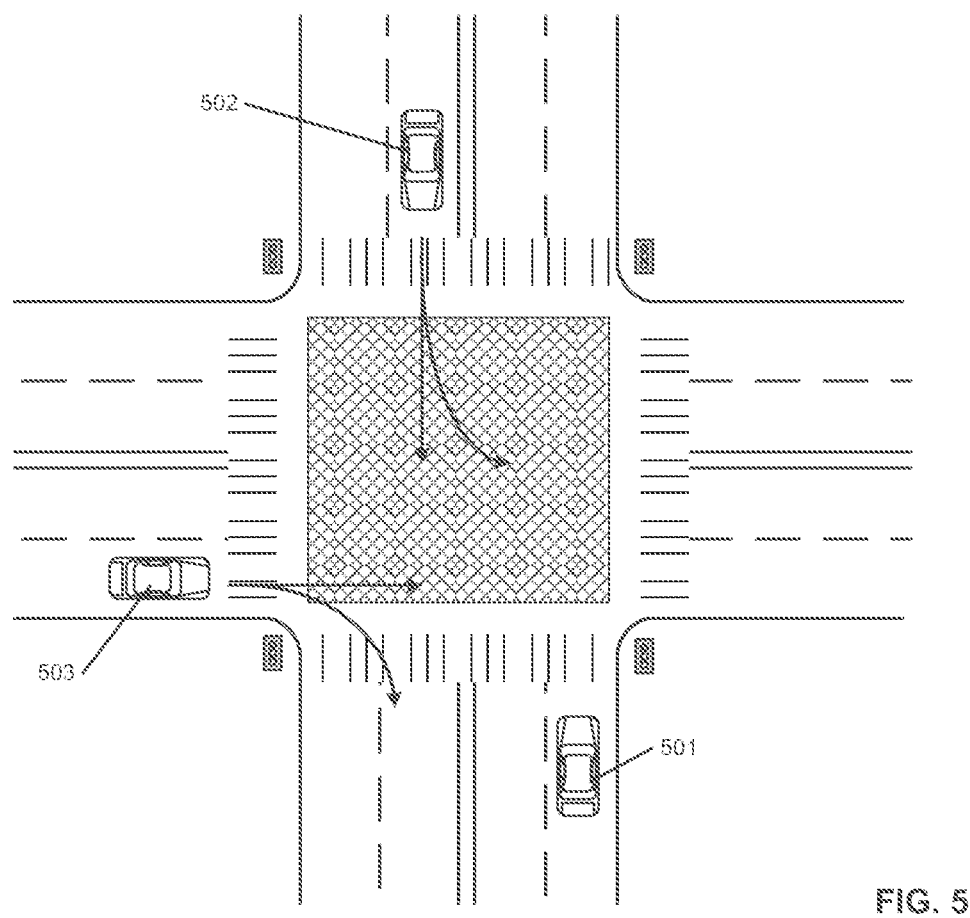
FIG. 5 is a block diagram illustrating an example of a driving environment recognized according to one embodiment.
Figure 6:
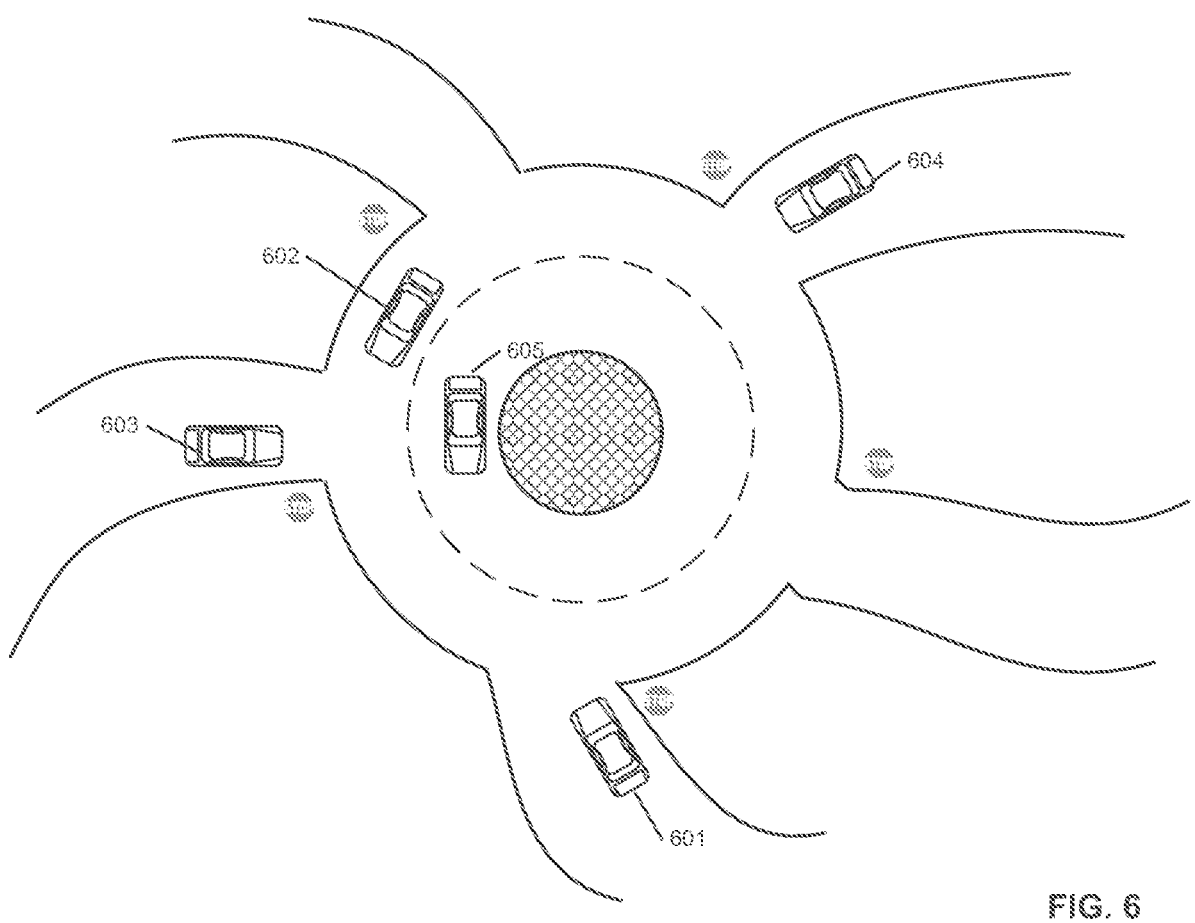
FIG. 6 is a block diagram illustrating an example of a driving environment recognized according to another embodiment.

According to one embodiment, the extracted features may include, but are not limited to, road curvature, intersection or junction, and roundabout. Features of road curvature include information indicating how winding a road especially on a junction is to help predict if a traffic participant is going to make turns. Features associated with an intersection or junction include information indicating how many cross roads an intersection has and how they connect as shown in FIG. 5. Features of a roundabout include information indicating how many exits and how they are distributed along the roundabouts as shown in FIG. 6.

Referring now to FIG. 5, in this example, an image of a map shows an intersection 500 in combination of perception data. In this example, based on the image recognition of map image, an intersection 500 is recognized by image analyzer 307. Features of intersection 500 are extracted by feature extractor 308. The features of intersection 500 may include a number of lanes for each direction of each lane, curvatures of the lanes, the locations of crosswalks, etc. In addition, the features may further include locations of traffic lights, stop signs, and/or yield signs that can be assumed or predicted given the nature of the intersection. The extracted features may be transformed into metadata describing the features, which may be similar to the data provided by a corresponding high-definition map. However, by using image recognition and feature extraction techniques, a regular map can be utilized without having to use a high-definition map.

Based on the features of the intersection 500 in combination of perception data perceiving vehicles 502-503, prediction module 303 can determine the current locations of vehicles 502-503 including which lanes vehicles 502-503 are currently traveling. Prediction module 303 can predict or determine the next moves or behaviors of vehicles 502-503. In this example, vehicle 502 is traveling on a left lane and dependent upon the traffic lights, vehicle 502 can move straight across the intersection or turn left. Vehicle 503 is traveling on the right lane and dependent upon the traffic lights, vehicle 503 can move straight across the intersection or turn right. Based on the speeds of vehicles 502-503, which may be estimated based on perception data, prediction module 303 can predict that at a higher speed, a vehicle typically moves straight and it is not feasible or safely to turn. On the other hand, if a vehicle is moving at a relatively low speed, the vehicle likely turns.

Alternatively, based on the perception data in view of the image analysis, intersection 500 may be determined to be a 4-way stop intersection. A 4-way stop intersection refers to an intersection without traffic lights. Rather, there is a stop sign disposed on each lane going into the intersection. In this configuration, prediction module 303 may predict that each of vehicles 501-503 has to fully stop before entering the intersection. The prediction of behaviors of vehicles 502-503 can be utilized by decision module 304 to determine what ADV 501 should move in the next moment.

Referring now to FIG. 6, based on a map image, a roundabout is recognized and a number of exits may also be determined as a part of features. In addition, based on traffic law, there is likely a stop sign located at the entrance of the roundabout. In this example, feature extractor 308 may determine that there are two lanes within the roundabout including an inside lane (e.g., fast lane) and an outside lane (e.g., slow lane). Based on the features provided by the image analyzer 307 and feature extractor 308, prediction module 303 may determine that vehicle 602 is traveling in the outside lane and dependent upon the speed perceived by perception module 302, vehicle 602 may or may not exit at the next exit or the exit thereafter. Prediction module 303 may further determine that since vehicle 605 is traveling in the inside lane, it is unlikely vehicle 605 will exit at the next exit. Similarly, prediction module 303 may predict that vehicles 603 and 604 may have to fully stop before entering the roundabout, because there is likely a stop sign disposed at the entrance provided by feature extractor 308. These information may be utilized by prediction module 303 to predict how each of vehicles 602-605 will likely behave, which will affect how decision module 304 to determine how ADV 601 will move in the next command cycle. Note that image analyzer 307 and/or feature extractor 308 may be integrated as a part of prediction module 303.

Figure 7:
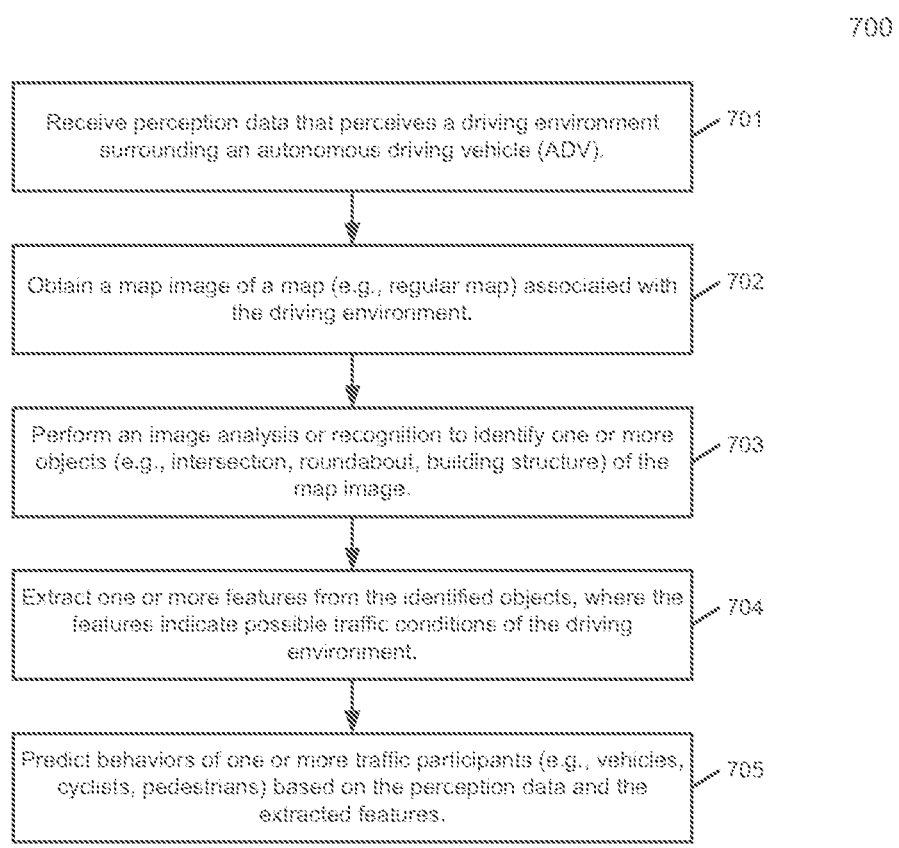
FIG. 7 is a flow diagram illustrating a process of operating an autonomous vehicle according one embodiment.

FIG. 7 is a flow diagram illustrating a process of operating an autonomous driving vehicle according to one embodiment. Process 700 may be performed by processing logic which may include software, hardware, or a combination thereof. For example, process 700 may be performed by image analyzer 307, feature extractor 308, and/or prediction module 303. Referring to FIG. 7, in operation 701, processing logic receives perception data that perceives a driving environment surrounding an ADV. In operation 702, processing logic obtains a map image of a map (e.g., regular definition map) associated with the driving environment. In operation 703, processing logic performs an image analysis or image recognition on the map image to identify one or more objects (e.g., intersection, roundabout, building structures) from the map image. In operation 704, processing logic extracts one or more feature from the recognized objects, where the features indicate possible traffic conditions of the driving environment. In operation 705, processing logic predicts behaviors of one or more traffic participants (e.g., vehicles, cyclists, pedestrians) based on the perception data in view of the extracted features.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 8:
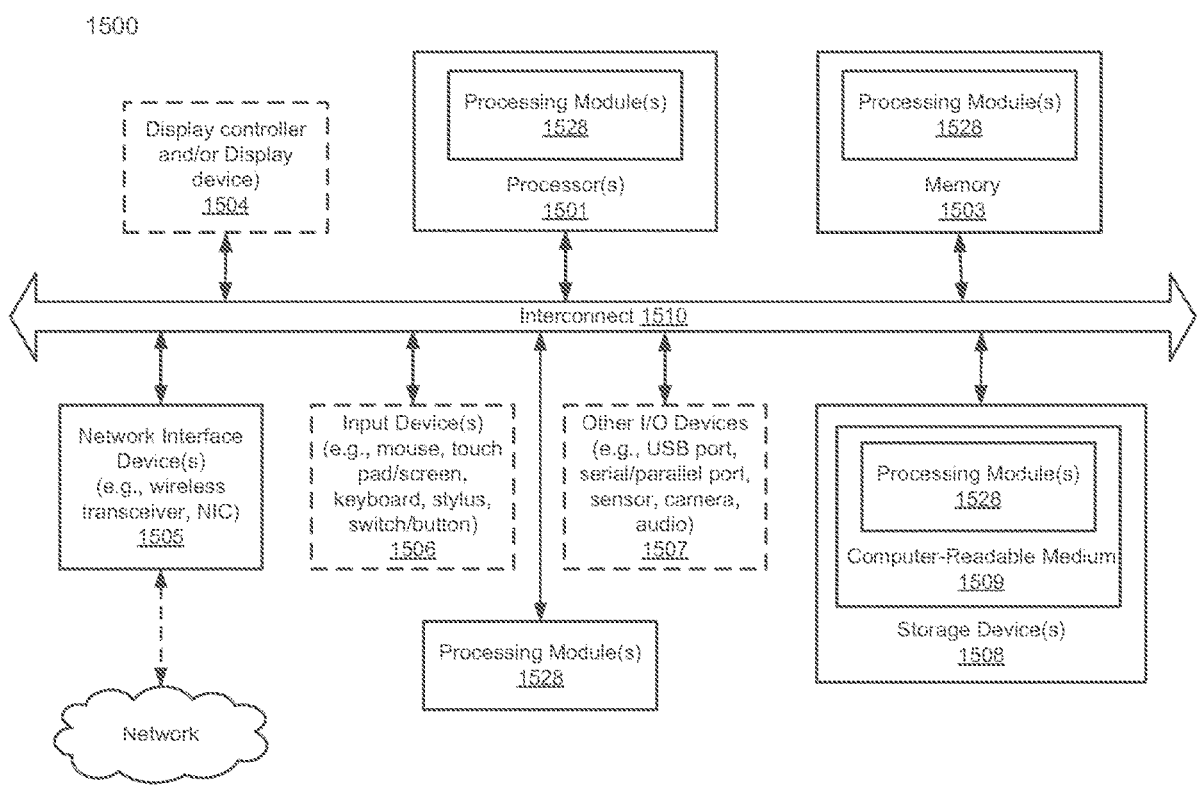
FIG. 8 is a block diagram illustrating a data processing system according to one embodiment.

FIG. 8 is a block diagram illustrating an example of a data processing system which may be used with one embodiment. For example, system 1500 may represent any of data processing systems described above performing any of the processes or methods described above, such as, for example, perception and planning system 110 or any of servers 103-104 of FIG. 1. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, image analyzer 307, and/or feature extractor 308. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle, the method comprising:
    in response to perception data perceiving a driving environment surrounding an autonomous driving vehicle (ADV), obtaining, by the ADV, a map image of a regular definition map covering a predetermined proximity with respect to a location associated with the driving environment, from a server or a persistent storage device of the ADV, wherein the map image includes a satellite image contained in the regular definition map;
    performing, by the ADV, an image recognition of the map image to recognize one or more objects from the map image, wherein the one or more objects are recognized based on at least one of shapes or colors of the objects obtained from the map image;
    extracting, by the ADV, one or more features from the recognized objects, wherein the one or more features indicate a traffic condition of the driving environment, wherein extracting one or more features comprises predicting possible a road sign based on a type of the recognized objects including a roundabout;
    predicting, by the ADV, behaviors of one or more traffic participants perceived from the perception data based on the extracted features; and
    planning, by the ADV, a trajectory for controlling the ADV to navigate through the driving environment based on the predicted behaviors of the one or more traffic participants.

2. The method of claim 1, wherein the one or more objects represent an intersection of a plurality of roads.

3. The method of claim 1, wherein the one or more objects represent a roundabout coupled to a plurality of roads.

4. The method of claim 1, wherein the one or more objects represent a parking lot along a road.

5. The method of claim 1, wherein extracting one or more features comprises estimating a curvature of a road based on the map image.

6. The method of claim 1, wherein the map image does not contain the road sign.

7. A non-transitory machine-readable medium having instructions stored therein, which when executed by a processor, cause the processor to perform operations, the operations comprising:
    in response to perception data perceiving a driving environment surrounding an autonomous driving vehicle (ADV), obtaining, by the ADV, a map image of a regular definition map covering a predetermined proximity with respect to a location associated with the driving environment, from a server or a persistent storage device of the ADV, wherein the map image includes a satellite image contained in the regular definition map;
    performing, by the ADV, an image recognition of the map image to recognize one or more objects from the map image, wherein the one or more objects are recognized based on at least one of shapes or colors of the objects obtained from the map image;
    extracting, by the ADV, one or more features from the recognized objects, wherein the one or more features indicate a traffic condition of the driving environment, wherein extracting one or more features comprises predicting possible a road sign based on a type of the recognized objects including a roundabout;
    predicting, by the ADV, behaviors of one or more traffic participants perceived from the perception data based on the extracted features; and
    planning, by the ADV, a trajectory for controlling the ADV to navigate through the driving environment based on the predicted behaviors of the one or more traffic participants.

8. The machine-readable medium of claim 7, wherein the one or more objects represent an intersection of a plurality of roads.

9. The machine-readable medium of claim 7, wherein the one or more objects represent a roundabout coupled to a plurality of roads.

10. The machine-readable medium of claim 7, wherein the one or more objects represent a parking lot along a road.

11. The machine-readable medium of claim 7, wherein extracting one or more features comprises estimating a curvature of a road based on the map image.

12. The machine-readable medium of claim 7, wherein the map image does not contain the road sign.

13. A data processing system, comprising:
    a processor; and
    a memory coupled to the processor to store instructions, which when executed by the processor, cause the processor to perform operations, the operations including
    in response to perception data perceiving a driving environment surrounding an autonomous driving vehicle (ADV), obtaining, by the ADV, a map image of a regular definition map covering a predetermined proximity with respect to a location associated with the driving environment, from a server or a persistent storage device of the ADV, wherein the map image includes a satellite image contained in the regular definition map,
    performing, by the ADV, an image recognition of the map image to recognize one or more objects from the map image, wherein the one or more objects are recognized based on at least one of shapes or colors of the objects obtained from the map image,
    extracting, by the ADV, one or more features from the recognized objects, wherein the one or more features indicate a traffic condition of the driving environment, wherein extracting one or more features comprises predicting possible a road sign based on a type of the recognized objects including a roundabout;
    predicting, by the ADV, behaviors of one or more traffic participants perceived from the perception data based on the extracted features, and planning, by the ADV, a trajectory for controlling the ADV to navigate through the driving environment based on the predicted behaviors of the one or more traffic participants.

14. The system of claim 13, wherein the one or more objects represent an intersection of a plurality of roads.

15. The system of claim 13, wherein the one or more objects represent a roundabout coupled to a plurality of roads.

16. The system of claim 13, wherein the one or more objects represent a parking lot along a road.

17. The system of claim 13, wherein extracting one or more features comprises estimating a curvature of a road based on the map image.

18. The system of claim 13, wherein the map image does not contain the road sign.

\* \* \* \* \*